United States Patent Office 3,649,415
Patented Mar. 14, 1972

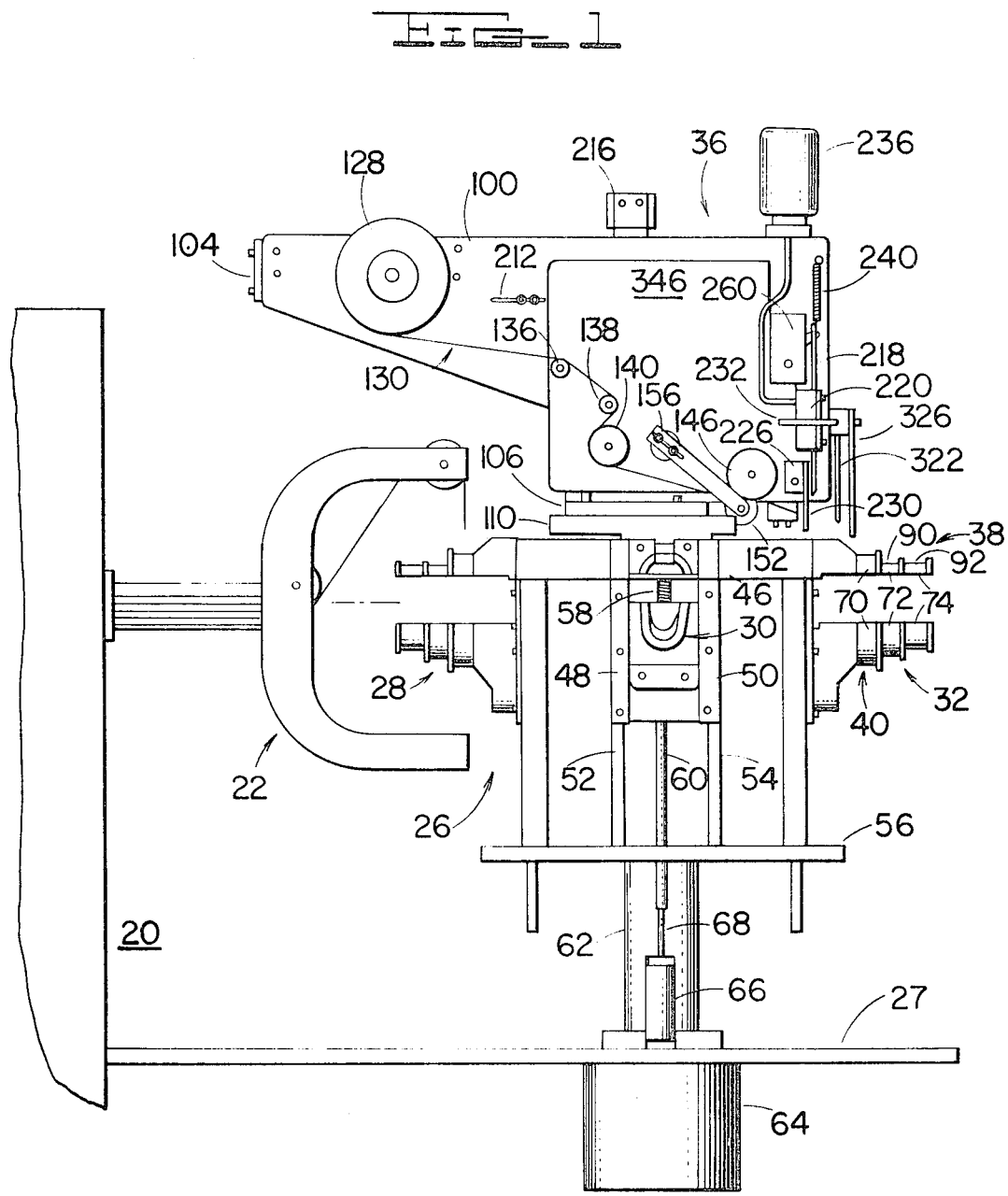

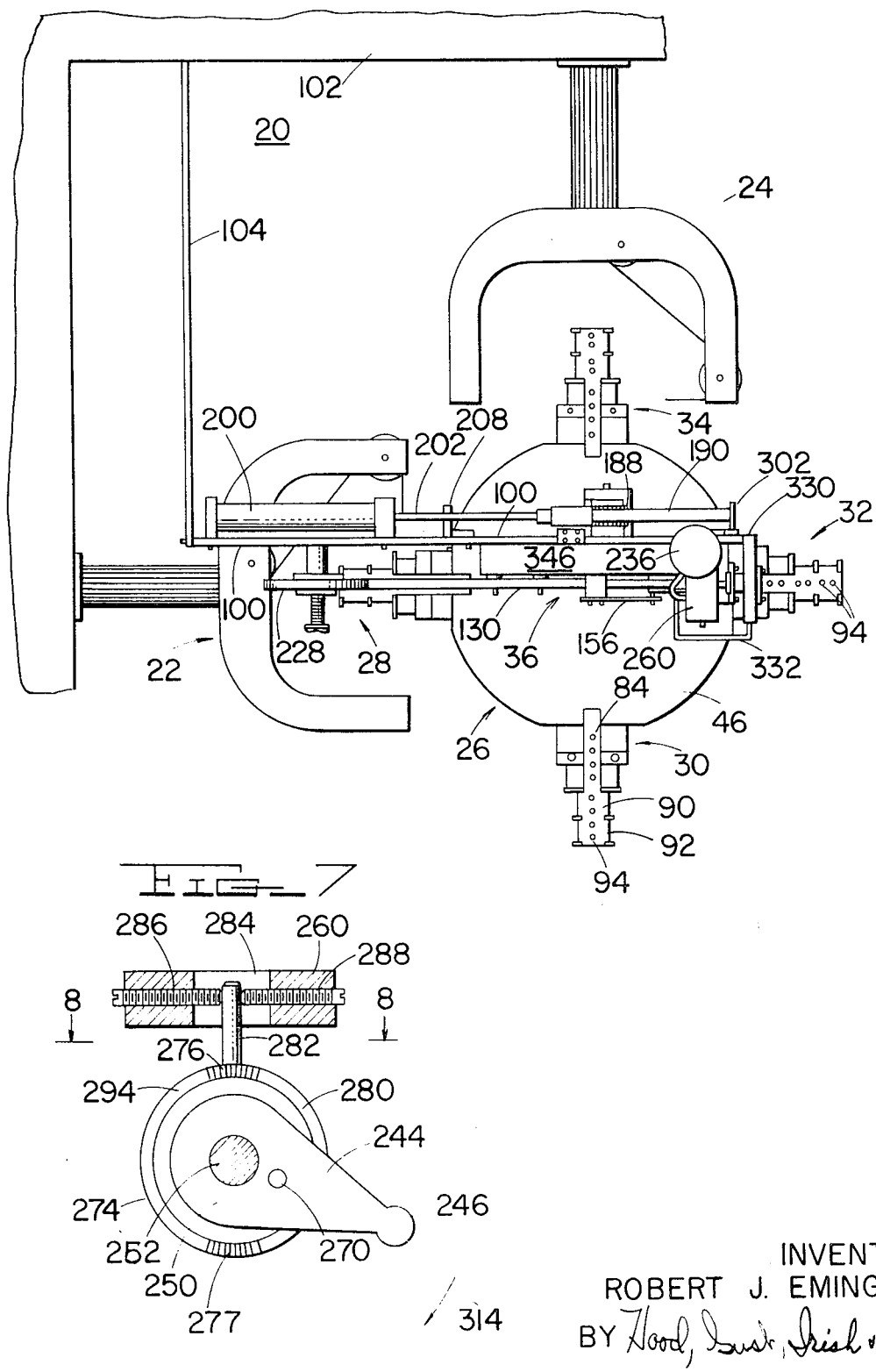

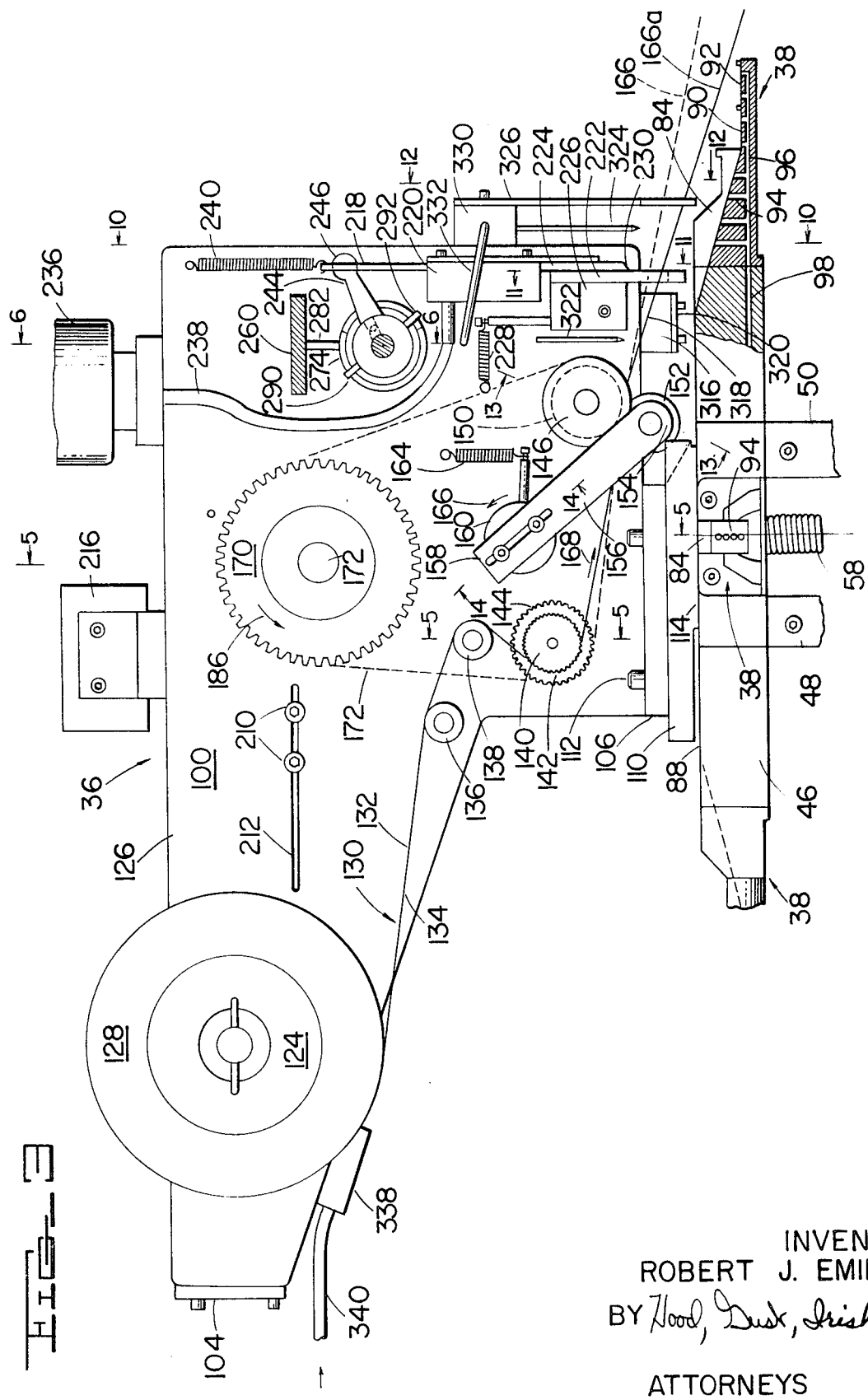

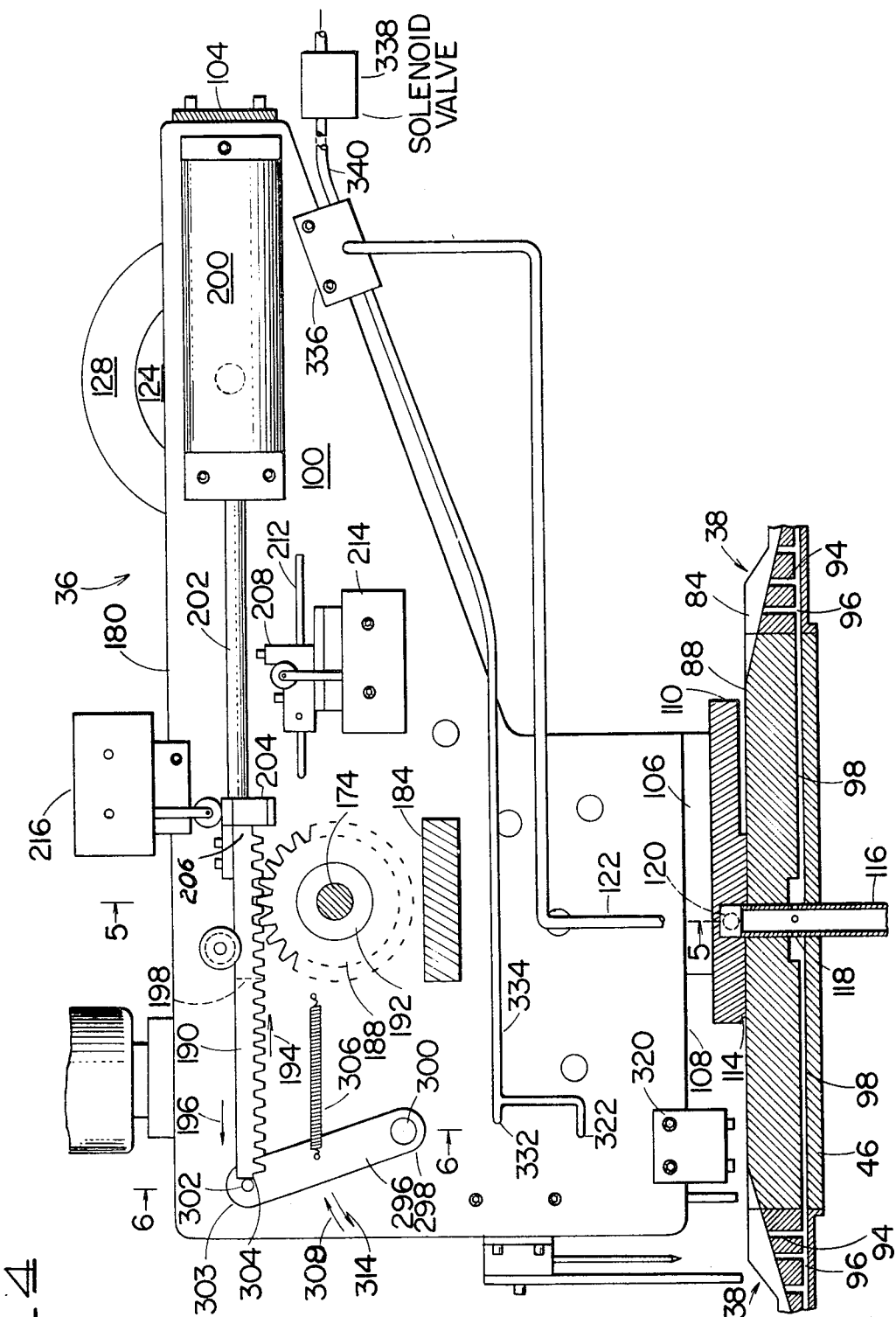

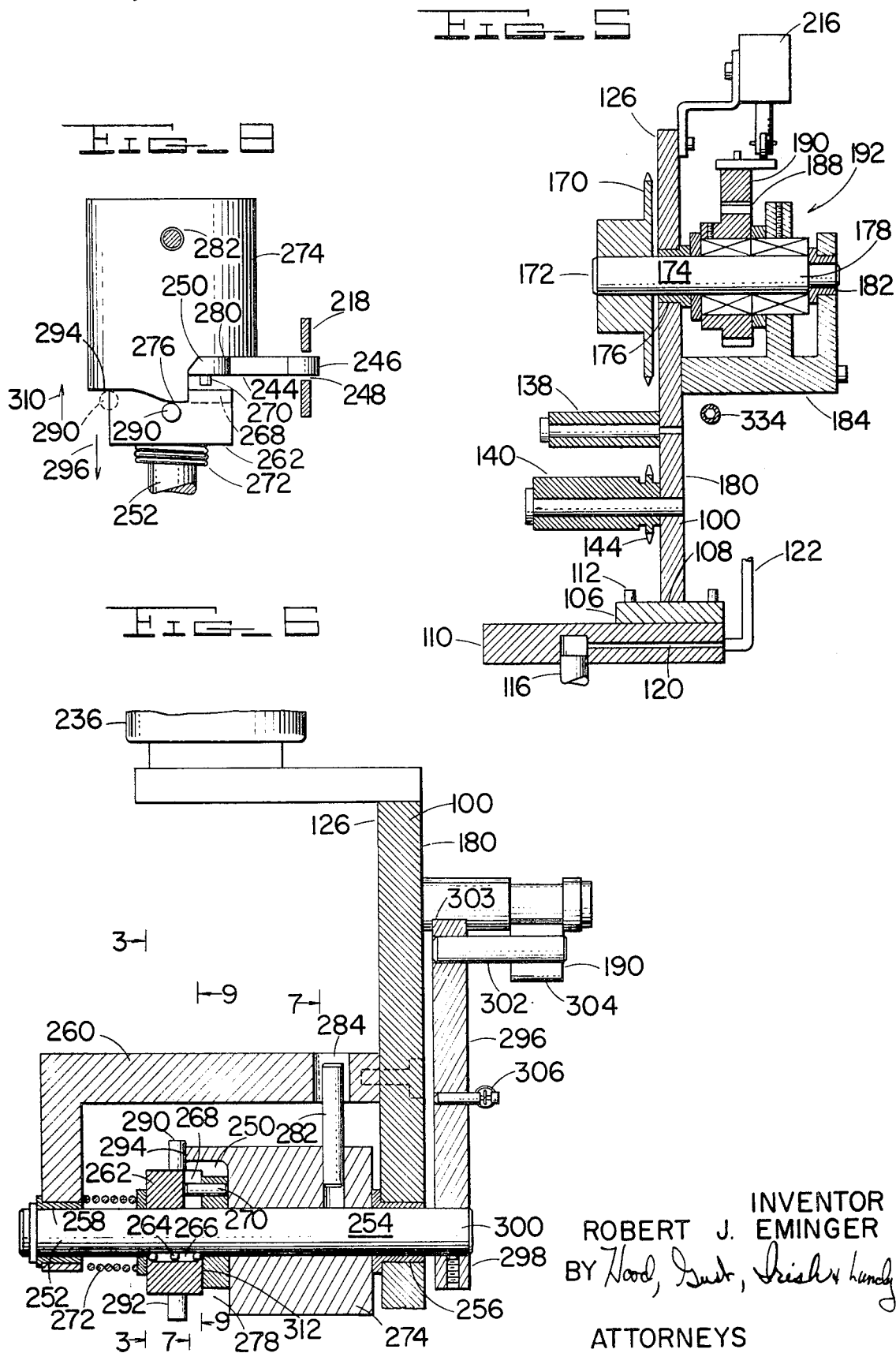

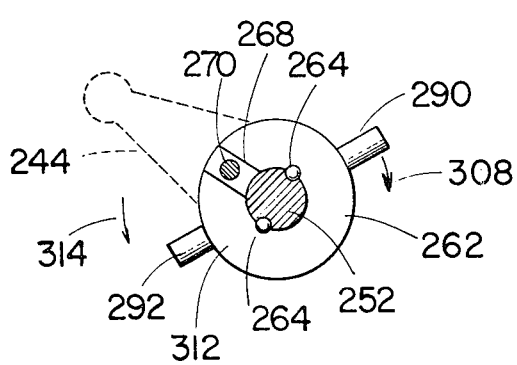
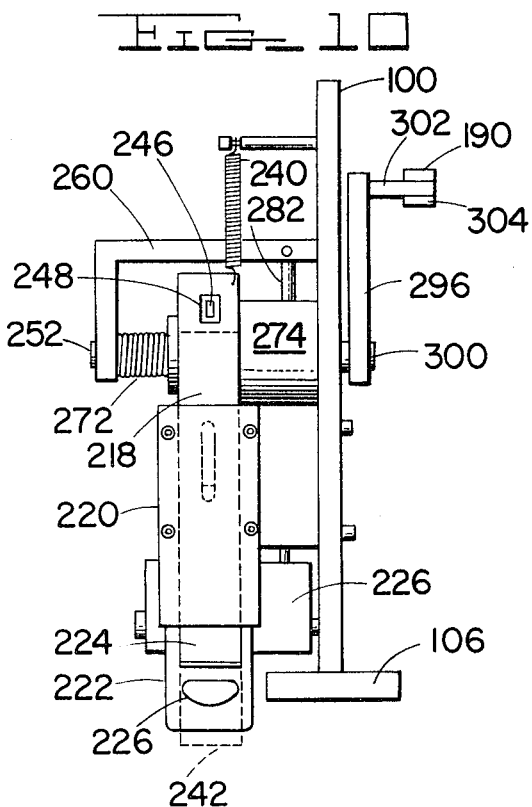
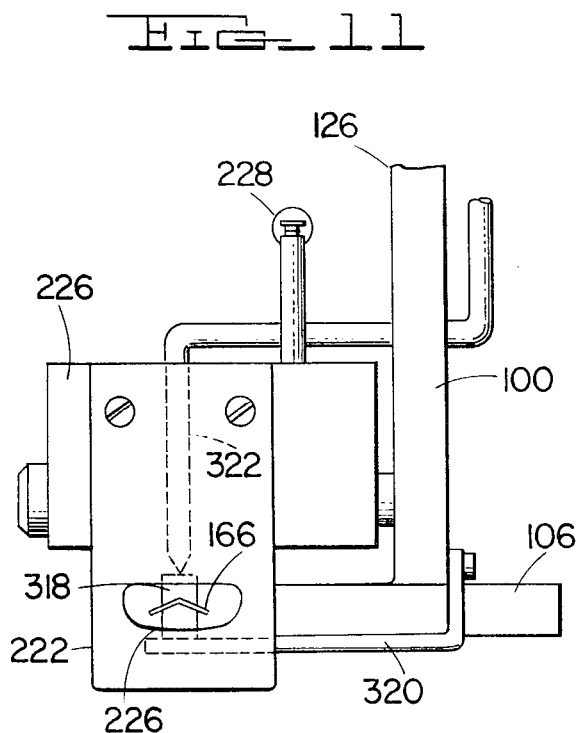
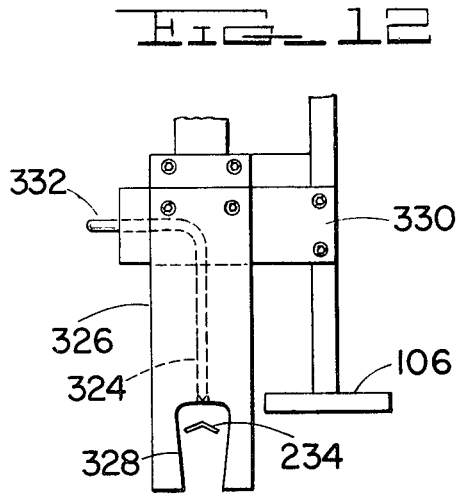
INVENTOR
ROBERT J. EMINGER
ATTORNEYS

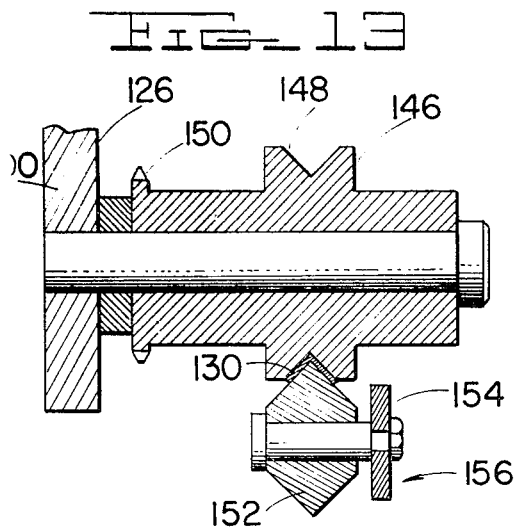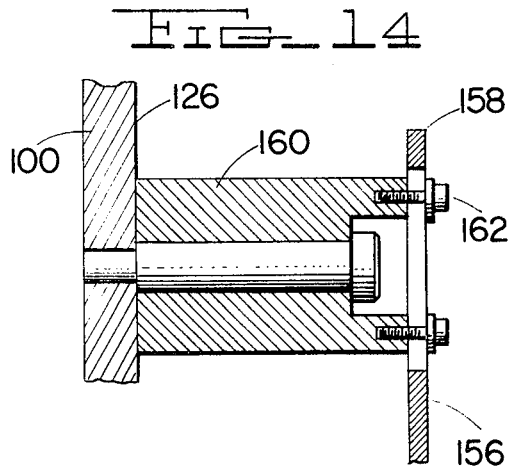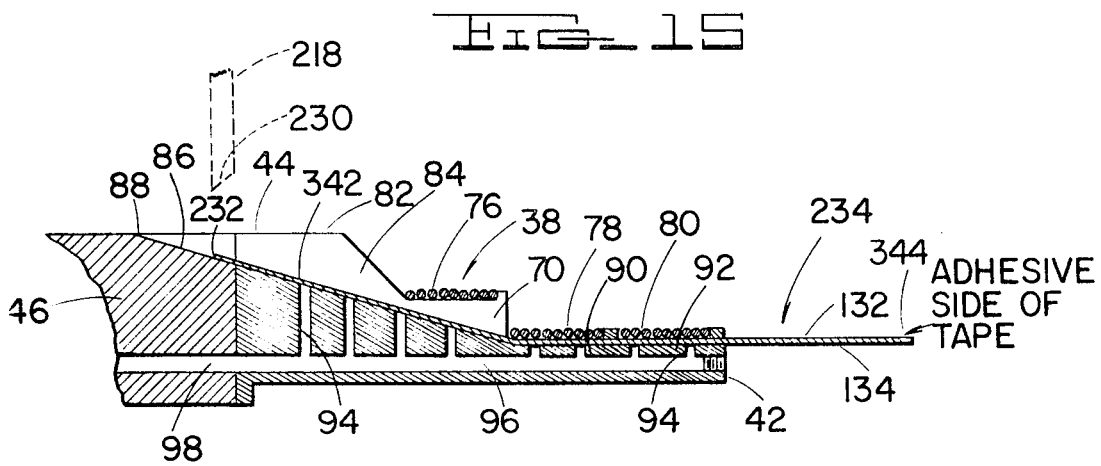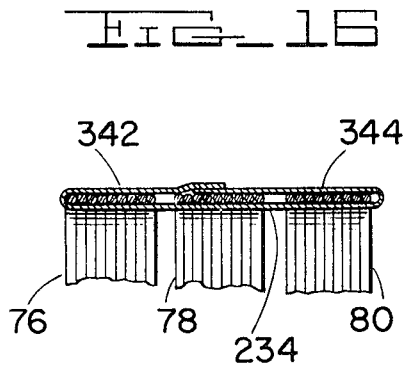

3,649,415
TAPE APPLYING APPARATUS FOR COIL WINDING MACHINE
Robert J. Eminger, Fort Wayne, Ind., assignor to Essex International, Inc., Fort Wayne, Ind.
Filed July 17, 1969, Ser. No. 842,567
Int. Cl. B31c 1/00; B65h 54/02
U.S. Cl. 156—521
26 Claims

ABSTRACT OF THE DISCLOSURE

A machine for winding dynamoelectric machine field coils including a coil form and a flyer winder for winding coils thereon, and apparatus for dispensing and applying adhesive tape to a coil to retain it in its coiled condition after removal from the coil form. The tape dispensing and applying apparatus includes means for advancing a predetermined length of adhesive tape longitudinally over a portion of the peripheral surface of the coil form prior to winding a coil thereon, the tape having an adhesive side which faces outwardly thereby to retain the coil wound thereover, and passages formed in the coil form which communicate with the surface portion thereof for applying a vacuum to the non-adhesive side of the tape, thereby to hold the tape on the coil form prior to and during the winding of a coil thereover.

BACKGROUND OF THE INVENTION

Field of the invention

This invention relates generally to machines for prewinding dynamoelectric machine field coils, and more particularly to apparatus for use with such machines for dispensing adhesive tape and applying the same to the coils wound thereby.

Description of the prior art

Machines for prewinding dynamoelectric machine field coils have been used for many years, such machines conventionally comprising a coil form and a flyer winder for winding the coils on the form. After winding, the coils are removed from the coil form and subsequently inserted in the slots of a dynamoelectric machine core member.

Since the coils after their removal from the coil form of the winding machine must be transported to another location for placement in the slots of the core member, a quantity of the wound coils frequently being accumulated prior to placement, it is desirable to prevent uncoiling of the coils. To this end, various types of clips have been manually placed upon the coils, and adhesive tape has also been manually applied to the coils in order to retain them in their coiled condition. Both of these prior methods of retaining the coils have been performed manually thus adding appreciably to the overall cycle time of the machine.

SUMMARY OF THE INVENTION

It is desirable to provide apparatus for use with a machine for prewinding dynamoelectric machine coils which will automatically apply adhesive tape to the coils thereby to retain the coils in their coiled condition. Thus, in accordance with the broader aspects of the invention, apparatus is provided for use in a coil winding machine which includes a coil form and means for winding a coil thereon, the apparatus applying adhesive tape to the coil to retain the same in its coiled condition after removal from the coil form. First means is provided for placing a predetermined length of adhesive tape on a portion of the peripheral surface of the coil form prior to winding a coil thereon, the tape having an adhesive side which faces outwardly thereby to retain the coil wound thereover, and second means is provided for holding the tape on the coil form prior to and during winding a coil thereover. In the preferred embodiment, the tape is held on the surface portion of the coil form by applying a vacuum to the non-adhesive side thereof.

It is accordingly an object of the invention to provide apparatus for use with a coil winding machine for applying adhesive tape to a coil wound thereby so as to retain the same in its coiled condition after removal of the coil from the machine.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevational view of the coil form turret and one flyer of a winding machine incorporating the tape dispensing and applying apparatus of the invention;

FIG. 2 is a top view of the winding machine of FIG. 1 showing both flyers;

FIG. 3 is a front side elevational view, partly in cross-section, illustrating the tape dispensing and applying apparatus of the invention;

FIG. 4 is a rear side elevational view, partly in cross-section, further illustrating the apparatus of the invention;

FIG. 5 is a fragmentary cross-sectional view taken generally along the line 5—5 of FIGS. 3 and 4;

FIG. 6 is a fragmentary cross-sectional view taken generally along the line 6—6 of FIGS. 3 and 4;

FIG. 7 is a fragmentary cross-sectional view taken generally along the line 7—7 of FIG. 6;

FIG. 8 is a view taken generally along the line 8—8 of FIG. 7;

FIG. 9 is a fragmentary cross-sectional view taken generally along the line 9—9 of FIG. 6;

FIG. 10 is an end view taken generally along the line 10—10 of FIG. 3;

FIG. 11 is a fragmentary end view taken generally along the line 11—11 of FIG. 3;

FIG. 12 is a fragmentary end view taken generally along the line 12—12 of FIG. 3;

FIG. 13 is a fragmentary cross-sectional view taken generally along the line 13—13 of FIG. 3;

FIG. 14 is a fragmentary cross-sectional view taken generally along the line 14—14 of FIG. 3;

FIG. 15 is a fragmentary cross-sectional view showing the coil form of the invention with the adhesive tape applied thereto and the coils wound thereover; and FIG. 16 is a fragmentary cross-sectional view showing a completed taped coil.

DESCRIPTION OF THE PREFERRED EMBODIMENT

Referring now to FIGS. 1 and 2 of the drawings, there is shown a machine, generally identified at 20, for prewinding dynamoelectric machine field coils, the machine 20 comprising two flyer-type coil winders 22, 24, coil form turret assembly 26 rotatably mounted on frame element 27 and having four stepped, collapsible coil forms 28, 30, 32 and 34 thereon, and adhesive tape dispensing and applying apparatus 36.

Each of the coil forms 28, 30, 32, 34 comprises an upper, fixed part 38 and a lower movable part 40. Each of the upper, fixed parts 38 has forward and rear ends 42, 44, the rear ends 44 being suitably secured to upper support plate 46 of the turret assembly 26. Each of the lower, movable parts 40 is mounted for vertical movement between collapsed and expanded position by a pair of guides 48, 50 respectively mounted on spacing elements 52, 54 which extend between upper support plate 46 and lower support plate 56. Fixed and movable coil forms 38, 40 are normally biased to their expanded positions by suitable springs 58, the movable coil forms 40 being respectively moved upwardly to their collapsed positions by push rods 60 which extend downwardly through lower support plate 56.

Coil form turret assembly 26 is rotatably mounted on frame element 27 by post 62, and is rotatably indexed successively to position coil forms 28, 30, 32 and 34 at two winding stations, an unloading station and a tape applying station by index drive motor 64. In FIGS. 1 and 2 coil form 28 is shown at a winding station in cooperative relationship with flyer 22, coil form 30 is shown at the unloading station, coil form 32 is shown at the tape applying station, and coil form 34 is shown at a winding station in winding relationship with flyer 24. The coil forms positioned at the two winding stations and at the tape applying station are biased to their expanded positions by springs 58. Fluid cylinder 66 mounted on frame element 27 at the unloading station has its piston rod 68 aligned with the respective push rod 60 so that piston rod 68, upon extension, engages the end of the respective push rod 60 thereby to move the respective lower coil form part 40 upwardly against spring 58 so as to collapse the coil form, as shown in FIG. 1.

In the illustrated embodiment each coil form 28, 30, 32 and 34 has three progressively smaller steps 70, 72 and 74 longitudinally spaced apart between its rear and forward ends for respectively forming three concentric coils 76, 78 and 80 thereon. In the illustrated embodiment, the two coils 76 and 78 are wound by the flyer 24, while the smallest coil 80 is wound by the flyer 22. The flyers 22, 24 may be operated to wind the respective coils by any suitable drive mechanism, the drive mechanism not forming a part of the present invention. Preferably, the flyer drive mechanisms are the type illustrated and described in continuation-in-part application Ser. No. 813,798, filed Mar. 19, 1969, entitled "Coil Winding Apparatus and Method" of the present inventor and assigned to the assignee of the present application.

In the illustrated embodiment, step 70 of each fixed coil form part 38 is elevated above steps 72 and 74 which are axially aligned. Step 70 is spaced from rear end 44 and upper support plate 46 by mounting portion 82. Slot 84 is formed in support plate 46, mounting portion 82 and step 70 and having its bottom 86 tapering downwardly and forwardly from the upper surface 88 of mounting plate 46 to the level of steps 72, 74, as best seen in FIGS. 3 and 15. It will be seen that steps 72 and 74 of fixed coil form parts 38 have flat, longitudinally extending surface portions 90, 92 in alignment with slot 84 and forming an extension of its bottom 86.

Fixed coil form parts 38 have a plurality of longitudinally spaced apart vacuum passages 94 formed therein communicating with bottom 86 of slot 84 and with the surface portions 90 and 92 of steps 72, 74. A longitudinally extending manifold passage 96 joins passages 94 and forms an extension of vacuum passage 98 in support plate 46.

Tape dispensing and applying assembly 36 comprises a mounting plate 100 rigidly secured to frame portion 102 of machine 20 by bracket 104. Plate 106 is secured to the bottom edge 108 of plate 100, as by welding, and has a bearing plate 110 secured thereto by suitable threaded fasteners 112. Bearing plate 110 has a portion 114 resting upon upper surface 88 of support plate 46 and rotatably connected thereto by a fixed hollow shaft 116 about which coil form turret assembly 26 rotates, as best seen in FIG. 4. Vacuum passages 98 in support plate 46 communicate with the interior of hollow shaft 116 through suitable openings 118 therein. Vacuum passages 120 in bearing plate 110 communicates with the upper end of hollow shaft 116 and has vacuum line 122 connected thereto, as best seen in FIG. 5. A suitable cutoff (not shown) blocks vacuum passage 98 in support plate 46 which communicates with manifold passage 96 and vacuum passages 94 of the top coil form part 38 at the unloading station, thereby cutting off the vacuum at the unloading station to permit the removal of coils from the respective collapsed coil form.

Tape reel 124 is rotatably mounted on side 126 of mounting plate 100 and has a spool 128 of adhesive tape removably mounted thereon. Tape 130 wound on spool 128 has an adhesive side 132 and a non-adhesive side 134.

Tape 130 withdrawn from spool 128 has its non-adhesive side 134 passing over guide rollers 136, 138 rotatably mounted on side 126 of mounting plate 100. Tape drive roller 140 having a serrated peripheral surface 142 is rotatably mounted on side 126 of mounting plate 100 and has the adhesive side 132 of tape 130 trained therearound, as best seen in FIG. 3. Gear 144 is secured to tape drive roller 140 for rotatably driving the same.

Tape crimping roller 146 is rotatably mounted on side 126 of mounting plate 100 and has a generally V-shaped groove 148 formed in its periphery, as best seen in FIG. 13. Gear 150 is secured to crimping roller 146 for rotatably driving the same. A cooperating generally V-shaped crimping roller 152 is rotatably mounted on end 154 of lever 156 which has its other end 158 adjustably secured to pivot member 160 by means of suitable threaded fasteners 162, as best seen in FIG. 14. Pivot member 160 is rotatably mounted on side 126 of mounting plate 100. Spring 164 biases pivot member 160 and arm 156 in the direction shown by the arrow 166 (FIG. 3) thereby to urge crimping roller 152 into engagement with crimping roller 146, as best seen in FIG. 13. Tape 130 passes between crimping rollers 146, 152 with its adhesive side 132 engaging the V-shaped groove 148 of crimping roller 146, thereby having a longitudinally extending generally V-shaped crimp imparted thereto which tends to maintain the length of tape which exists from the crimping rollers 146, 152 in a generally straight, self-supporting condition, as shown by the dashed line 166 in FIG. 3.

Tape drive roller 140 and crimping roller 146 are driven in the direction to withdraw tape 130 from spool 128 and to advance the tape over the coil form part 38 at the tape applying station, in the direction shown by the arrow 168, by drive gear 170 and drive chain 172 trained around gear 170, gear 144 and gear 150. Gears 144 and 150 have the same number of teeth and pitch diameter thus rotating tape drive roll 140 and crimping roller 146 at the same speed. However, the diameter of crimping roller 146 is larger than the diameter of tape drive roller 140 and thus, being driven at the same speed, crimping roller 146 tends to slip on the adhesive side 132 of the tape, while still advancing the tape, so that the tape does not tend to adhere to and follow the crimping roller 146.

Drive gear 170 is secured to end 172 of shaft 174 journaled in bearing 176 in mounting plate 100. The other end 178 of shaft 174 on the opposite side 180 of mounting plate 100 is journaled in bearing 182 and bracket 184.

Gear 170 is rotated in the direction shown by the arrow 186 (FIG. 3) by means of gear 188 and cooperating rack 190. Gear 188 is coupled to shaft 174 by a conventional one-way clutch assembly 192 arranged so that linear movement of rack 190 in the direction shown by arrow 194 (FIG. 4) rotates shaft 174 and drive gear 170 in direction 186, whereas linear movement of rack 190 in the opposite direction shown by the arrow 196 does not rotate shaft 174 and gear 170.

Rack 190 is linearly moved between a first, inactive position, as shown in solid lines in FIG. 4 and a second, tape-advanced position shown by the dashed line 198, by a conventional fluid cylinder 200 mounted on side 180 of mounting plate 100 and having its piston rod 202 connected to rack 190. It will thus be seen that retraction of piston rod 202 of cylinder 200 will rotate gear 188 and drive gear 170 in direction 186 thereby to withdraw tape 130 from spool 128 and to advance a length of tape from crimping rollers 146, 152 longitudinally over the coil form part 38 at the tape applying station. At the retracted end of the stroke of piston rod 202 and rack 190, block 204 at end 206 of rack 190 engages stop 208 adjustably mounted on side 180 of mounting plate 100 by suitable threaded fasteners 210 in slot 212 (FIG. 3). It will be seen that selective adjustment of the position of stop 208 will determine the length of the retractile movement of rack 190, thus determining the length of the section of tape advanced over the coil form part 38. A suitable limit switch 214 mounted on stop 208, and adjustable therewith, detects the extremity of the retractile movement of rack 190 and is employed to terminate the retractile stroke of cylinder 200. Another suitable limit switch 216 mounted on mounting plate 100 detects the inactive or extended limit of movement of rack 190 and again is employed to terminate the protractive stroke of cylinder 200.

A knife blade 218 is provided slidably mounted for vertical reciprocatory motion in mounting block 220 secured to side 126 of mounting plate 100. It will be observed that knife blade 218 is generally vertically aligned with a point spaced slightly rearwardly from the junction of fixed coil form part 38 with support plate 46, as best seen in FIGS. 3 and 15. Shear plate 222 cooperates with lower end 224 of knife blade 218 and has an opening 226 formed therein through which the dispensed length of tape 166 extends. Shear plate 222 is mounted on block 226 which is pivotally mounted on side 126 of mounting plate 100. Spring 228 biases pivot block 226 so that shear plate 222 is urged into shearing engagement with lower portion 224 and knife edge 230 of knife blade 218. It will now be seen that downward movement of knife blade 218 across opening 226 in shear plate 222 will sever the dispensed length of tape 166, as at 232, thereby to provide a predetermined length of tape 234 which is applied to fixed coil form 38, as will be hereinafter described. Block 220 and knife blade 218 are lubricated by lubricant dispensed by a suitable lubricant container 236 supported on mounting late 100 and connected to block 220 by a lubricant-supplying tube 238.

Knife blade 218 is biased to its upper, inactive position by spring 240, and is moved downwardly to its lower, tape-severing position, as shown by the dashed lines 242 (FIG. 10), by lever member 244 having its outer end 246 seated in notch 248 in the upper end of knife blade 218. Lever member 244 has its inner end 250 rotatably mounted on end 252 of shaft 254 journaled in bearing 256 in mounting plate 100. End 252 of shaft 254 is supported by bearing 258 in bracket 260 secured to side 126 of mounting plate 100. A releasable clutch block 262 is secured to end 252 of shaft 254 for rotation therewith and for axial movement thereon by means of suitable balls 264 in keyways 266 formed in the surface of shaft end 252 and in block 262. Block 262 has a radial slot 268 formed therein which normally receives pin 270 attached to end 250 of lever member 244. Block 262 is normally biased so that pin 270 is drivingly received within slot 268 by coil spring 272 which surrounds shaft end 252, as best seen in FIG. 6.

Cam block 274 is rotatably mounted on shaft end 252 and has a pair of oppositely disposed cam surfaces 276 formed thereon. Recess 278 formed in the cam block 274 accommodates end 250 of lever member 244 and a relief 280 formed in one side communicating with recess 278 accommodates lever member 244 (FIGS. 6, 7 and 8). Cam block 274 is restrained against rotation by pin 282 seated therein and extending into opening 284 in bracket 260. The rotational position of cam block 274 and thus, as will shortly be described, the lower extremity of the downward movement of knife blade 218, is adjustably determined by means of set screws 286 and 288 seated in bracket 260 and engaging pin 282, as best seen in FIG. 7.

A pair of oppositely disposed pins 290, 292 are secured to block 262 and respectively engage the cam surface of cam block 274, being urged into engagement therewith by spring 272. In the upper position of lever member 244 and knife blade 218, cam follower pin 290 engages dwell portion 294 of cam block 274, spring 272 thereby urging block 262 toward end 250 of lever member 244 so that pin 270 is drivingly received within slot 268 (FIGS. 3, 6 and 9). When lever member 244 and knife blade 218 are moved to their lower extremity, pins 290, 292 move into engagement with cam surfaces 276, 277 thereby moving block 262 in the direction shown by the arrow 296 (FIG. 8 against spring 272 so that pin 270 on end 250 of lever member 244 moves out of driving engagement with slot 268, thus permitting spring 240 immediately to return knife blade 218 and lever member 244 to their upper positions.

Lever member 296 has its end 298 drivingly secured to end 300 of shaft 254 extending outwardly from side 180 of mounting plate 100. Pin 302 is secured to the other end 303 of lever member 296 and is held in engagement with end 304 of rack 190 by spring 306 (FIGS. 4, 6 and 10).

It will now be seen that with piston rod 202 and rack 190 in their normal, extended positions, as shown in FIG. 4, end 304 of rack 190 will have moved lever member 296 to its extreme left position, thereby rotating shaft 254 so as to rotate block 262 to its position shown in FIG. 8 with pins 290, 292 engaging cam surfaces 276, 277, pin 270 thus being disengaged from slot 268 so that spring 240 has raised knife blade 218 and lever member 244 to their upper positions. Retraction of cylinder 200 and retractile movement of piston rod 202 and rack 190, which causes withdrawal and advance of length 166 of tape as above described, will be accompanied by pivotal movement of lever member 296, as shown by the arrow 308 (FIG. 4) under the influence of spring 306, thus rotating block 262 (which is drivingly secured to shaft end 252 by ball 264 in keyways 266) in direction 308, axial movement of block 262 in direction 310 (FIG. 8) being restrained by engagement of pin 270 with the surface 312 of block 262 until pin 270 moves into alignment with slot 268, at which time spring 272 will move block 262 in the direction shown by the arrow 310 to its position with pin 270 drivingly received within slot 268, this position being reached at the retractile end 198 of the movement of rack 190 at which point the length 166 of tape has been fully advanced from crimping rollers 146, 152.

Upon actuation of limit switch 214, the actuation of cylinder 200 is reversed thereby to extend piston rod 202 and rack 190 in direction 196 (FIG. 4) engagement of end 304 of rack 190 with pin 302 thus rotating lever member 296 in the direction shown by the arrow 314. With pin 270 now drivingly received in slot 268 in block 262, consequent rotation of block 262 in direction 314 (by virtue of the driving connection with shaft end 252 provided by balls 264 in keyways 266) will rotate lever member 244 downwardly, thereby moving knife blade 218 downwardly to its lower severing position. As above described, at its lowermost position reached when rack 190 is in its extreme extended position, as shown in FIG. 4, block 262 will be moved axially in direction 296 by engagement of pins 290, 292 with cam surfaces 276, 277 thereby moving slot 268 out of driving engagement with pin 270, thereby permitting spring 240 immediately to return knife blade 218 and lever member 244 to their upper positions.

Block 316 having a tapered upper surface 318 is supported by a bracket 320 adjacent the rear side of shear plate 222. An air line 322 is provided for directing a stream of air under pressure downwardly on the adhesive side of the dispensed length of tape 166 thereby to force the unadhesive side of the tape downwardly into engagement with tapered surface 318 of block 316 to support the tape during the severing operation, as best seen in FIGS. 3 and 11. Thus, after dispensing of the length of tape by crimping rollers 146, 152 and application of the stream of air under pressure by air line 322, but immediately before the tape-severing operation, the tape extends over fixed coil form part 38, as shown in solid lines at 166a in FIG. 3.

As will shortly be described, vacuum is applied to vacuum line 122 and passages 98, 96 and 94, thereby to retain the severed length of tape 234 in engagement with the tapered bottom surface 86 of slot 84 and the flat surfaces 90, 92 of fixed coil form part 38, as seen in FIG. 15. In order to assure that the severed length of tape 234 is moved downwardly toward coil form part 38 sufficiently to come under the influence of the vacuum applied to passages 94, another air line 324 disposed forwardly of knife blade 218 directs a stream of high pressure air downwardly on the adhesive side of the severed length of tape 234 thus moving it downwardly into slot 84 so that it is pulled into engagement with bottom 86 of slot 84 and the flat surfaces 90 and 92 by the vacuum applied to the passages 94. In order to guide the severed length of tape 234 during this downward movement, guide plate 326 is provided forwardly of the air line 324 and having an open slot 328 formed therein which guides the severed length of tape 234, as best seen in FIGS. 3 and 12. Guide plate 326 is secured to mounting plate 100 by bracket 330.

Air line 332 enters block 330 and communicates with air line 324, air lines 322 and 332 passing through mounting plate 100 and being connected to common air line 334, as best seen in FIG. 4. In this embodiment, vacuum is provided by a venturi 336 connected in air line 334 and having vacuum line 122 connected thereto. A suitable solenoid-actuated air valve 338 is coupled in the input air line 340 for controlling the application of high pressure air and vacuum.

A suitable cover member 346 may be provided on side 126 of mounting plate 100 to enclose gears 144, 150 and 170, and drive chain 172.

Referring now particularly to FIGS. 15 and 16, it will be observed that when coil 76 is wound on coil form step 70, the severed length of tape 234, having its non-adhesive side 134 in engagement with the bottom 86 of slot 84, will not have its adhesive side 132 initially adhesively engaging coil 76, however, it will be further observed that coils 78 and 80 are wound directly over the adhesive side 132 of the severed length of tape 234. It will further be observed that the severed length of tape 234 has an end 342 which projects rearwardly from coil 76, and another end 344 which projects forwardly from coil 80. When the coil form having the wound coils thereon, as shown in FIG. 15, is indexed to the coil unloading station, the vacuum is removed from the fixed coil from part 38 and the form is collapsed, as above described. The operator may then simply and quickly fold the ends 342 and 344 of the length of tape 234 over the outer surface of the coils and then remove the coils from the coil form to provide a set of taped coils, as shown in FIG. 16. A suitable control system for automatically sequencing the operation of the apparatus including collapsing of the coil form at the unloading station, the withdrawal and dispensing of tape, the application of air and vacuum and severing of the tape, and the sequential winding of the coils as shown and described in application Ser. No. 811,016, filed Mar. 27, 1969 of the present inventor and assigned to the assignee of the present application.

It will now be seen that in accordance with the invention, there is provided apparatus for use in conjunction with a machine for prewinding dynamoelectric machine coils which automatically dispenses and applies adhesive tape to the coils thereby to retain the coils in their coiled condition upon removal from the coil form.

While there have been described above the principles of this invention in connection with specific apparatus, it is to be clearly understood that this description is made only by way of example and not as a limitation to the scope of the invention.

What is claimed is:

1. In a coil winding machine including a coil form and means for winding a coil thereon, apparatus for applying adhesive tape to said coil to retain the same in its coiled condition after removal from said coil form comprising: first means for placing a predetermined length of adhesive tape on a portion of the peripheral surface of said coil form prior to winding a coil thereon, said tape having an adhesive side which faces outwardly thereby to retain the coil wound thereover; and second means for holding said tape on said coil form prior to and during winding a coil thereover.

2. The apparatus of claim 1 wherein said tape has a non-adhesive side which engages said surface portion of said coil form, said second means including means for applying a vacuum to said non-adhesive side of said tape.

3. The apparatus of claim 2 wherein said vacuum applying means includes a passage in said coil form communicating with said surface portion.

4. The apparatus of claim 1 wherein said second means includes means for directing a stream of air under pressure onto said adhesive side of said tape.

5. The apparatus of claim 1 wherein said coil form has a longitudinal axis, said surface portion extending longitudinally parallel with said axis.

6. The apparatus of claim 5 wherein said first means includes means for advancing said length of tape longitudinally over said surface portion.

7. The apparatus of claim 5 wherein said first means includes means for withdrawing said tape from a supply thereof and for advancing the same longitudinally over said surface portion, and means for severing said predetermined length of tape when the same has been advanced over said surface portion.

8. The apparatus of claim 7 wherein said severing means includes means coupled to said advancing means and operated thereby for actuating said severing means in response to advance of said predetermined length of tape over said surface portion.

9. The apparatus of claim 7 wherein said first means further includes means for crimping said tape longitudinally.

10. The apparatus of claim 7 wherein said withdrawing and advancing means comprises a drive roller frictionally engaging said tape, a gear and a rack cooperatively meshing therewith, linear-acting power actuator means connected to said rack for linearly moving the same between first and second positions thereby to rotate said gear, and one-way clutch means coupling said gear to said drive roller for rotating the same in one direction to withdraw and advance said predetermined length of tape in response to movement of said rack in one direction from said first to said second positions thereof.

11. The apparatus of claim 10 wherein said severing means comprises a knife blade, and means for mounting said blade for reciprocatory movement in a plane generally normal to said axis between a first tape-severing position and a second inactive position, and means coupling said blade to said rack and actuated thereby in response to movement thereof from said first to said second positions for moving said blade from its inactive to its severing position.

12. The apparatus of claim 11 wherein said severing means further includes means for normally biasing said blade to said inactive position thereof, said coupling means including releasable clutch means for releasing the coupling of said blade to said rack when said blade reaches said severing position whereby said biasing means returns said blade to its inactive position.

13. The apparatus of claim 7 wherein said coil form has forward and rear ends, said surface portion extending longitudinally therebetween, said rear end of said coil form being connected to a support member, said severing means being adjacent said rear end of said coil form.

14. The apparatus of claim 13 wherein said tape has a non-adhesive side which engages said surface portion of said coil form, said second means including a plurality of longitudinally spaced passages in said coil form communicating with said surface portion thereof, a manifold passage having a first portion in said support member and a second portion in said coil form communicating with said plurality of passages, and means for applying a vacuum to said first manifold passage portion whereby a vacuum is applied to said non-adhesive side of said tape by said plurality of passages thereby to hold said predetermined length of tape on said surface portion.

15. The apparatus of claim 14 wherein said coil form has a longitudinally extending slot formed in its peripheral surface at least in part defining said surface portion, at least some of said plurality of passages communicating with said slot.

16. The apparatus of claim 13 wherein said tape has a non-adhesive side which engages said surface portion of said coil form, and further comprising means adjacent said severing means and on the side thereof remote from said coil form for supporting the non-adhesive side of said tape, first means for directing a stream of air under pressure onto said adhesive side of said tape over said supporting means for holding said tape thereon, and second means for directing a stream of air under pressure onto said adhesive side of said tape over said surface portion of said coil form adjacent said severing means thereby to move the severed predetermined length of tape into engagement with said surface portion.

17. The apparatus of claim 16 further comprising means for guiding the severed predetermined length of tape onto said surface portion of said coil form.

18. The apparatus of claim 16 further comprising means intermediate said supporting means and said withdrawing and advancing means for imparting a longitudinally extending generally V-shaped crimp to said tape with the apex thereof extending away from said surface portion of said coil form.

19. The apparatus of claim 13 wherein said severing means comprises a knife blade, means for mounting said blade for reciprocatory movement in a plane generally normal to said axis between a first tape-severing position and a second inactive position, and a shear plate cooperatively engaging said knife blade, said shear plate having an opening therein with said tape passing therethrough.

20. The apparatus of claim 13 wherein said winding means winds said coil on said coil form at a location spaced longitudinally from said rear end thereof whereby a first free end of severed predetermined length of tape projects rearwardly therefrom, said predetermined length of tape having a second free end projecting forwardly from said coil whereby said first and second free ends may be folded over said coil.

21. The apparatus of claim 14 further comprising means for directing at least one stream of air under pressure onto the adhesive side of said tape, an air line adapted to be connected to a source of air under pressure and coupled to said directing means for supplying air thereto, said vacuum applying means comprising a venturi in said air line.

22. The apparatus of claim 13 further comprising frame means for supporting said withdrawing and advancing means and said severing means, and means for relatively rotating said support member and coil form with respect to said frame means from a coil unloading station, to a tape applying station with said surface portion longitudinally aligned with said withdrawing and advancing means and said severing means, and to a coil winding station with said coil form in winding relationship with said winding means.

23. The apparatus of claim 22 wherein said tape has a non-adhesive side which engages said surface portion, said second means including a first passage in said coil form communicating with said surface portion, a second passage in said support member communicating with said first passage, a vacuum conduit adapted to be coupled to a vacuum source, and means for rotatably coupling said vacuum conduit and second passage thereby to apply a vacuum to said non-adhesive side of said tape.

24. The apparatus of claim 22 further comprising first means for rigidly supporting said frame means, second means for rotatably supporting said support member, and means rotatably connecting said first and second supporting means.

25. The apparatus of claim 22 wherein said tape has a non-adhesive side which engages said surface portion, said supply including means for removably and rotatably mounting a spool of said tape on said frame means; said withdrawing and advancing means comprising a tape drive roller rotatably mounted on said frame means and frictionally engaging the non-adhesive side of said tape extending from said spool, said drive roller being spaced from said severing means, a first crimping roller rotatably mounted on said frame means intermediate said drive roller and severing means, a second crimping roller and means mounted on said frame means for biasing the same into engagement with said first crimping roller, said first and second crimping rollers having said tape passing therebetween and having cooperating peripheral configurations to impart a longitudinal, generally V-shaped crimp to said tape with the apex thereof facing away from said surface portion of said coil form, and drive means for simultaneously rotating said drive roller and said first crimping roller thereby to withdraw said tape from said spool and to advance the same over said surface portion of said coil form.

26. The apparatus of claim 25 wherein said first crimping roller engages the adhesive side of said tape, said first crimping roller having a higher peripheral speed than said drive roller, said withdrawing and advancing means further including a gear rotatably mounted on said frame means and a rack cooperatively meshing therewith, linear-acting power actuator means mounted on said frame means and connected to said rack for linearly moving the same between first and second positions thereby to rotate said gear, and one-way clutch means coupling said gear to said drive means for rotating the same in one direction to withdraw and advance said predetermined length of tape in response to movement of said rack in one direction from said first to said second position thereof.

References Cited
UNITED STATES PATENTS 2,782,809    2/1957    Smallridge _____ 242—7.09
3,253,794    5/1966    Twigg _____ 242—7.08

BENJAMIN A. BORCHELT, Primary Examiner

J. V. DORAMUS, Assistant Examiner

U.S. Cl. X.R.

156—172, 431; 242—7.09